(12) United States Patent
Park et al.

(10) Patent No.: US 8,416,316 B2
(45) Date of Patent: Apr. 9, 2013

(54) APPARATUS AND METHOD FOR ADJUSTING WHITE BALANCE IN A DIGITAL IMAGING DEVICE

(75) Inventors: Min-Kyu Park, Seoul (KR); Hyun-Hee Park, Seoul (KR); Sung-Dae Cho, Yongin-si (KR); Moon-Gi Kang, Seoul (KR); Chang-Won Kim, Seoul (KR); Hyun-Mook Oh, Seoul (KR)

(73) Assignees: Samsung Electronics Co., Ltd., Yeongtong-gu, Suwon-si, Gyeonggi-do (KR); Industry-Academic Cooperation Foundation Yonsei University, Seodaemun-Gu, Seoul (KR)

( * ) Notice: Subject to any disclaimer, the term of this patent is extended or adjusted under 35 U.S.C. 154(b) by 835 days.

(21) Appl. No.: 12/378,124

(22) Filed: Feb. 11, 2009

(65) Prior Publication Data

US 2009/0207274 A1 Aug. 20, 2009

(30) Foreign Application Priority Data

Feb. 12, 2008 (KR) ........................ 10-2008-0012777

(51) Int. Cl.
*H04N 9/73* (2006.01)
(52) U.S. Cl. .................................................. 348/223.1
(58) Field of Classification Search ..... 348/223.1–225.1
See application file for complete search history.

(56) References Cited

U.S. PATENT DOCUMENTS

| | | | | |
|---|---|---|---|---|
| 5,481,302 A | * | 1/1996 | Yamamoto et al. | 348/223.1 |
| 5,619,347 A | * | 4/1997 | Taniguchi et al. | 358/516 |
| 7,200,264 B2 | * | 4/2007 | Hubel et al. | 382/167 |
| 7,791,649 B2 | * | 9/2010 | Kim et al. | 348/223.1 |
| 2006/0164521 A1 | * | 7/2006 | Chikane et al. | 348/223.1 |
| 2009/0303345 A1 | * | 12/2009 | Deguchi et al. | 348/223.1 |
| 2012/0008010 A1 | * | 1/2012 | Nakami | 348/223.1 |

* cited by examiner

Primary Examiner — Timothy J Henn
(74) Attorney, Agent, or Firm — Cha & Reiter, LLC

(57) ABSTRACT

A method and apparatus for adjusting a white balance in a digital imaging device. The method including the steps of: analyzing a histogram of an image to which a white balance algorithm is to be applied; classifying the image, to which the white balance algorithm is to be applied, according to color distribution determination criteria; and the white balance algorithm is applied to the image in a customized manner based on results of the classification based on color distributions. The apparatus includes an image sensor unit for photographing a subject and for creating an original image; and an image processing unit for finding an achromatic color region through estimation of a color temperature of the original image, for extracting a white point of the achromatic color region, and for adjusting a white balance of the original image.

20 Claims, 6 Drawing Sheets

APPARATUS AND METHOD FOR ADJUSTING WHITE BALANCE IN A DIGITAL IMAGING DEVICE

CLAIM OF PRIORITY

This application claims priority under 35 U.S.C. §119 from an application entitled "Apparatus And Method For Adjusting White Balance In Digital Imaging device" filed with the Korean Intellectual Property Office on Feb. 12, 2008 and assigned Serial No. 2008-12777, the contents of which are incorporated herein by reference in its entirety.

BACKGROUND OF THE INVENTION

1. Field of the Invention

The present invention relates to an imaging device. More particularly, the present invention relates to an apparatus and method for adjusting a white balance of an imaging device.

2. Description of the Related Art

Every light has its own color temperature value. A color temperature is a temperature representing the color of light emitted from a light source, and is generally expressed in Kelvin temperature measurement. For example, light rays of the sun, candlelight, and fluorescent lamps have different color temperature values. The reason why people hardly feel the differences between color temperatures is that human eyes have an excellent Auto White Balance function. The white balance represents relative intensities of red, green and blue colors of light emitted from a light source.

With respect to a camera, a low color temperature causes a captured image to be reddish, and a high color temperature causes a captured image to be bluish. The camera can obtain a normal color balance under sunlight. However, an image captured by the camera becomes reddish under a glow lamp or candle light, which has a lower color temperature than sunlight, and an image captured by the camera becomes bluish under a fluorescent lamp or in cloudy weather, which has a higher color temperature than sunlight. For this reason, a camera obtains a yellowish picture under a glow lamp, and obtains a bluish picture under a fluorescent lamp.

For example, adjusting a white balance may be regarded as a task of recording colors that a camera senses and receives through light on the actual spot in order to exactly express colors reflected by a subject. Generally, in order to settle discord of hues due to color temperatures, which are different depending on illumination states indoors or outdoors, an image pickup device in a camcorder or camera typically adjusts a white balance to obtain a visually smooth image in such a manner as to normally photograph a white-color chart or paper placed at a position of a subject and to balance hues in a bright portion of a screen. A white-color object is seen as a slightly different color depending on illuminations on the actual spots. Therefore, adjusting a white balance is a process of memorization that a color currently reflected by a white-color object corresponds originally to a white color in a camera.

Generally, a there is a known Von Kries method based on Gray World Assumption (GWA) is the most widely used for the white balance. The GWA is a theory that if all colors in the world are mixed an achromatic color is obtained, so that if various colors exist in an image, the mean value of all colors in the image results in an achromatic color. The achromatic color has only brightness, has no color component, and represents that the mean values of the respective RGB (Red, Green, Blue) channels are equal to each other. Adjusting the mean values obtained in the respective channels to be equal to each other based on the GWA is known as the Von Kries method.

FIG. 1 is a flowchart illustrating an entire operation of a conventional Auto White Balance algorithm for a digital image.

In step 101, pixel values of the entire region/area of an original image photographed by a digital imaging device are detected. Then, in step 103, the mean value of the detected pixel values is calculated, and in step 105, the hue components of the calculated mean value are compared do determine whether the hue component is equal to each other. When it is determined at step 105 that the color components of the calculated mean value are not equal to each other, then step 107 is performed. In step 107, color component values according to pixels are adjusted to be equal to each other, and then step 109 is performed. In contrast, at step 105, when the color components of the calculated mean value are equal to each other, the method jumps to step 109 and performs the storage step. More particularly, in step 109, the resultant image, to which an equal mean value is applied, is stored, and then the procedure is finished.

Methods which are basically enhancements of the conventional Auto White Balance algorithm and are now widely used in an image signal processors (ISPs) include: a Fuzzy Rule method (FRM) of partitioning one image into a plurality of regions, comparing the mean values of the respective regions with each other, and determining a weight value for white balance; a method of detecting an achromatic color and finding out a weight value for white balance based on the detected image; and a method of detecting an achromatic color by selecting, as achromatic colors, pixels where a brightness value is equal to or greater than a predetermined threshold value, and also an absolute value of a difference between R and G values and an absolute value of a difference between B and G values are equal to or less than a predetermined threshold value.

However, the above technologies have many problems. For example, the FRM has a problem in that the result is changed depending on the sizes of partitioned regions and the determined weight value, and the method using detection of an achromatic color has a problem in that the result is changed according to achromatic color detection methods. Even when various colors are not included in an image, as well as when an image is constituted by only one color or a few colors, there is still a degree of difficulty in estimating an accurate white point.

SUMMARY OF THE INVENTION

Accordingly, the present invention provides an apparatus and method for accurately adjusting a white balance of an image by classifying an image according to the characteristics thereof and estimating an accurate white point through a color temperature estimation.

In accordance with an exemplary aspect of the present invention, there is provided a method for adjusting a white balance in a digital imaging device, the method including the steps of: analyzing a histogram of an image to which a white balance algorithm is to be applied; classifying the image, to which the white balance algorithm is to be applied, according to color distribution determination criteria; and applying the white balance algorithm to the image depending on results of the classification based on color distributions. The white balance algorithm is applied differently (i.e. customized) to different images depending on the color distributions.

In accordance with another exemplary aspect of the present invention, there is provided an apparatus for adjusting a white balance in a digital imaging device, the apparatus including: an image sensor unit for photographing a subject and creating an original image; and an image processing unit for finding an achromatic color region through estimation of a color temperature of the original image, for extracting a white point of the achromatic color region, and for adjusting a white balance of the original image.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION

Hereinafter, an exemplary embodiment of the present invention will be described with reference to the accompanying drawings. In the below description, many particular items such as a detailed component device are shown, but these are given only for providing the general understanding of the present invention. It will be understood by those skilled in the art that various changes in form and detail may be made within the scope of the present invention.

As described in the "Description of the Related Art," the FRM has a problem in that the result changes depending on the sizes of partitioned regions and the determined weight value, and the method using detection of an achromatic color has a problem in that the result is changed according to achromatic color detection methods. Also, even when there are no various colors included in an image, as well as when an image is constituted by only one color or a few colors, it is difficult to estimate an accurate white point. Therefore, in order to solve the above-mentioned problems, the present invention proposes a new method for achieving an accurate white balance of an image in such a manner as to classify the image according to the characteristic thereof, to extract an achromatic color region through a color temperature estimation, and to estimate an accurate white point. Hereinafter, the present invention will be described in detail with reference to a flowchart and a block diagram which illustrate the configuration of an apparatus according to an exemplary embodiment of the present invention.

The entire operation of a white balance algorithm according to the present invention is constituted roughly by three parts.

First, an input image is classified into an image having a distribution of colors higher than a preset threshold value, and an image having a distribution of colors lower than the preset threshold value. Next, the image having a distribution of colors lower than the preset threshold value is once more classified into a single-color image and a non-single-color image. With respect to each of the image having a distribution of colors higher than the preset threshold value and the non-single-color image, among the images classified into three types, an achromatic color region is detected, and the white balance algorithm is applied to the corresponding image by using the detected achromatic color region. In contrast, with respect to the single-color image, the white balance algorithm is not applied.

Figure 1:
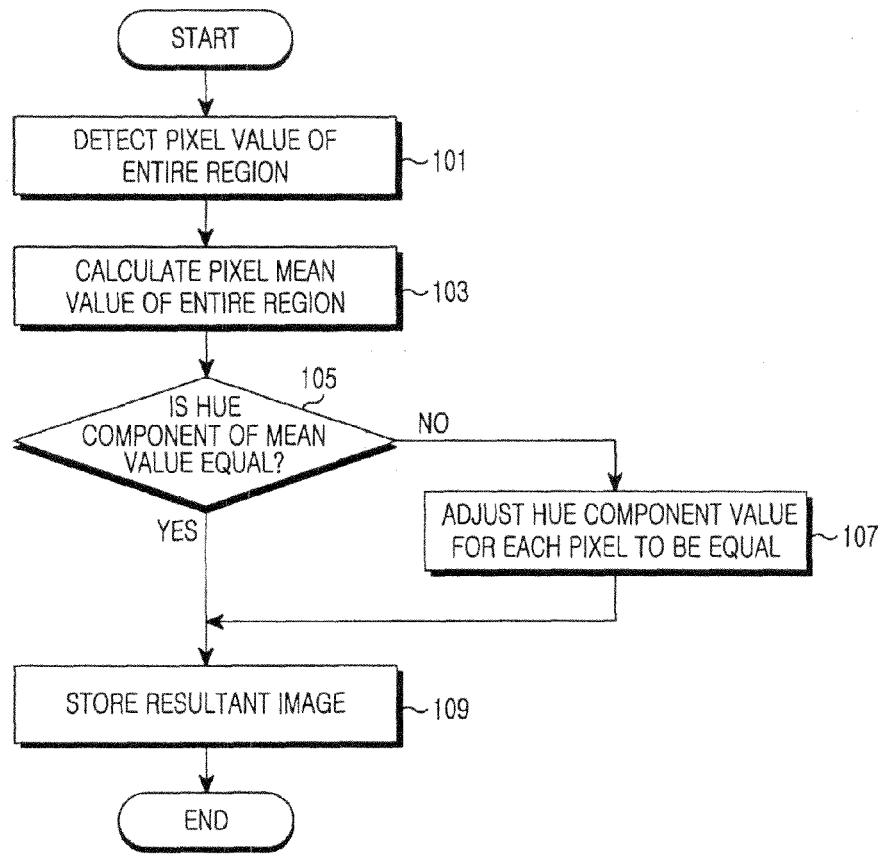
FIG. 1 is a flowchart illustrating an entire operation of a conventional Auto White Balance algorithm for a digital image.
Figure 2:
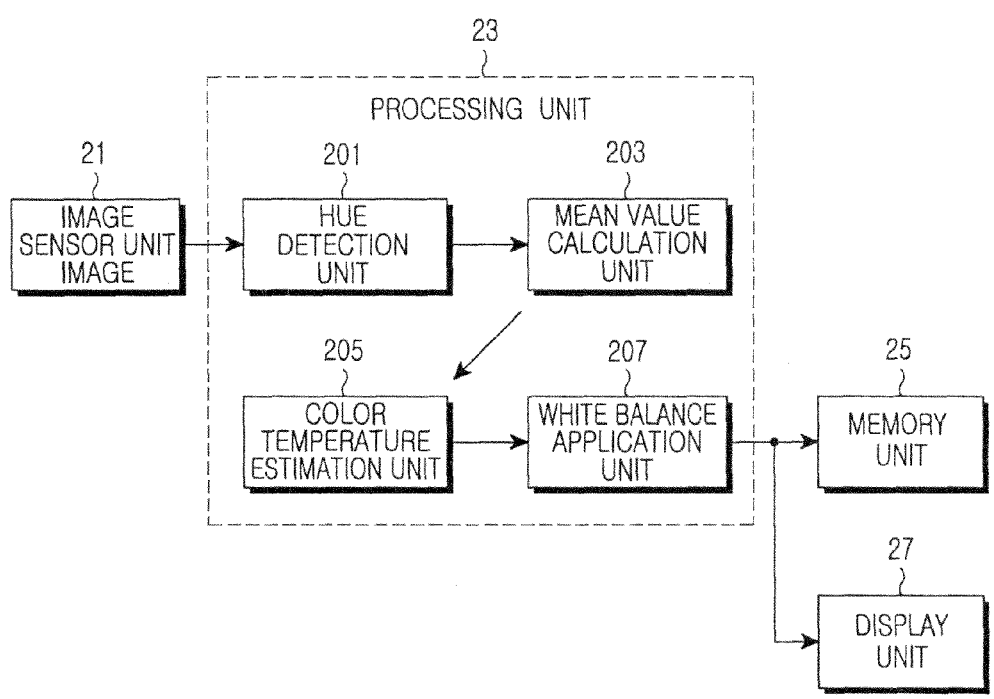
FIG. 2 is a block diagram illustrating the internal configuration of an imaging device having a white balance compensation function according to an exemplary embodiment of the present invention.

FIG. 2 is a block diagram illustrating the internal configuration of an imaging device having a white balance compensation function according to an exemplary embodiment of the present invention. The imaging device includes an image sensor unit 21, an image processing unit 23, a memory unit 25, and a display unit 27, wherein the image processing unit 23 includes a hue detection unit 201, a mean value calculation unit 203, a color temperature estimation unit 205, and a white balance application unit 207.

When the image sensor unit 21 photographs a subject and creates an original image, the hue detection unit 201 of the image-processing unit 23 determines color distribution values by identifying a histogram distribution characteristic of the image. The mean value calculation unit 203 receives the determined color distribution values, and calculates the mean value of the determined color distribution values. The color temperature estimation unit 205 estimates a color temperature by using the mean value obtained by the mean value calculation unit 203, thereby detecting an achromatic color region. The white balance application unit 207 applies a white balance to the original image by using the estimated color temperature and the achromatic color region. The image, to which the white balance has been applied, is stored in the memory unit 25, or is displayed through the display unit 27 according to a user's adjustment. A procedure of applying the white balance algorithm will now be described with reference to the configuration.

Figure 3:
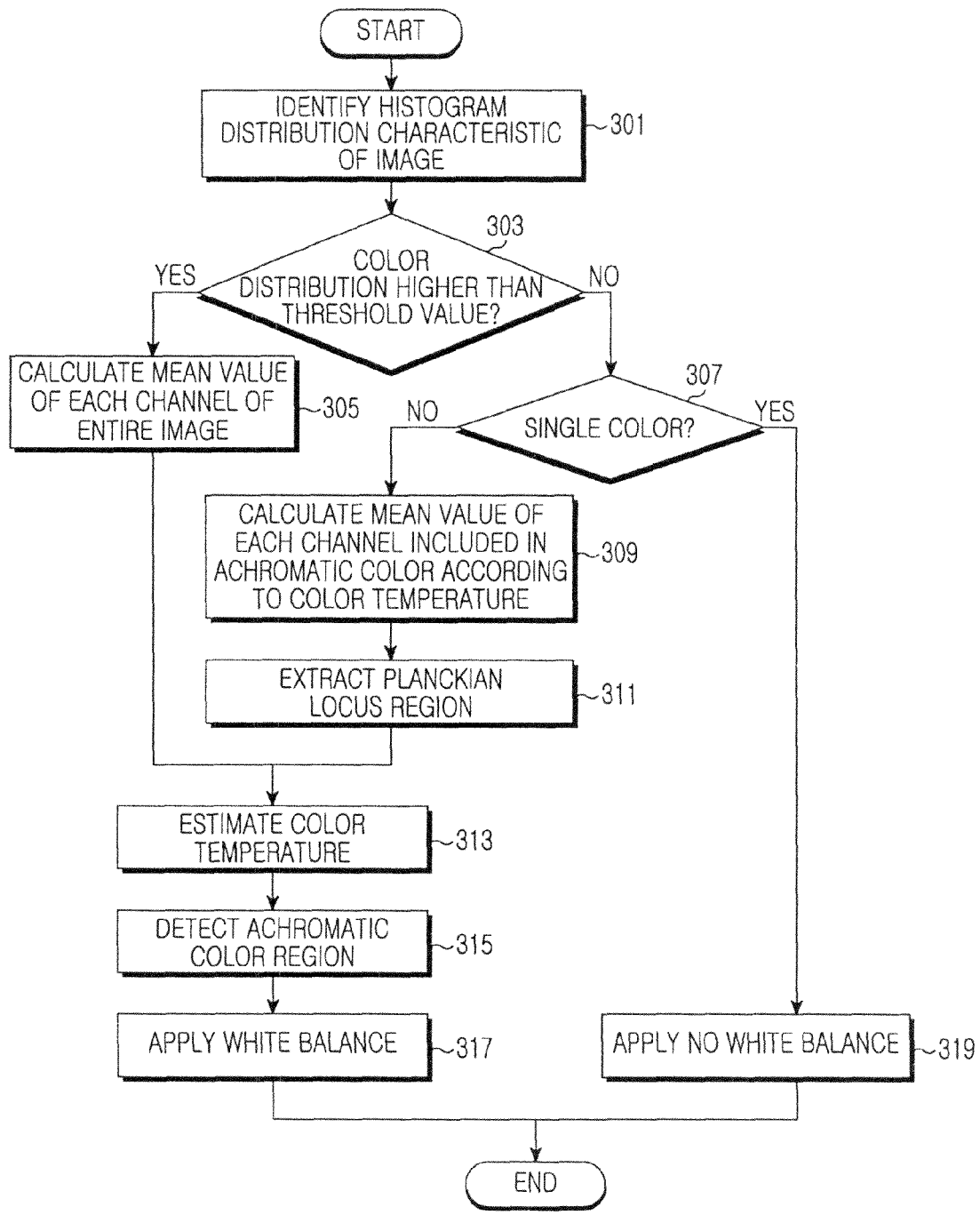
FIG. 3 is a flowchart illustrating one example of an entire operation of a white balance algorithm according to an exemplary embodiment of the present invention.

FIG. 3 is a flowchart illustrating an exemplary operation of the white balance algorithm according to an exemplary embodiment of the present invention. The entire operation of the white balance algorithm shown in FIG. 3 is configured to process an image by classifying the image into three types, that is, an image having a distribution of a great number of colors, an image having a distribution of minority colors, and a single-color image.

Referring now to FIG. 3, in step 301, a histogram distribution characteristic of an image, a white balance of which is to be adjusted, is identified. In order to identify the histogram distribution characteristic, differences between a maximum value and a minimum value with respect to the RGB channels in pixels, except for pixels having brightness values of an upper "a" % and a lower "b" %, are defined as dR, dG, and dB, respectively. Here, the "a" and "b" may be defined as certain numbers between 0 and 50.

In step 303, it is determined whether the color distribution is higher than a threshold value, e.g. the image corresponds to an image having a distribution of various colors. When an absolute value of a difference between a difference value in the G channel and a difference value in the R channel, and an absolute value of a difference between a difference value in the G channel and a difference value in the B channel are equal to or greater than preset threshold values, respectively, the image is determined not to be an image having a distribution of various colors. This is expressed as the following equation.

$$|dR-dG|<th1R$$
$$|dB-dG|<th1B \quad (1)$$

In contrast, when an absolute value of a difference between a difference value in the G channel and a difference value in the R channel, and an absolute value of a difference between a difference value in the G channel and a difference value in the B channel are less than the preset threshold values, respectively, the image is determined to be an image having a distribution of various colors, and in this case, it is determined that the mean values of histograms of channels are similar to each other. When it is assumed that the mean values of the RGB channels are uR, uG, and uB, respectively, similarity can be measured by the following equation.

$$|uR-uG|<th2R$$
$$|uB-uG|<th2B \quad (2)$$

In equations 1 and 2, the threshold values "th1R," "th1B," "th2R," and "th2B" are determined according to images through simulations. That is, when both conditions of equations 1 and 2 are satisfied, it is determined that histogram distributions according to channels are similar to each other, thereby determining the image to have a distribution of various colors.

When it is determined in step 303 that the image has a distribution of various colors by application of equations 1 and 2, step 305 is performed. In contrast, when it is determined that the image has a distribution of a small number of colors (or possible a single color), rather than a distribution of various colors, step 307 is performed. First, a procedure of adjusting a white balance with respect to an image having a distribution of various colors will be described.

In step 305, with respect to the image having a distribution of various colors, color temperatures are estimated, for example, by using the Robertson method. The estimation method will now be described with reference to the accompanying drawings which illustrates a color temperature distribution.

Figure 4:
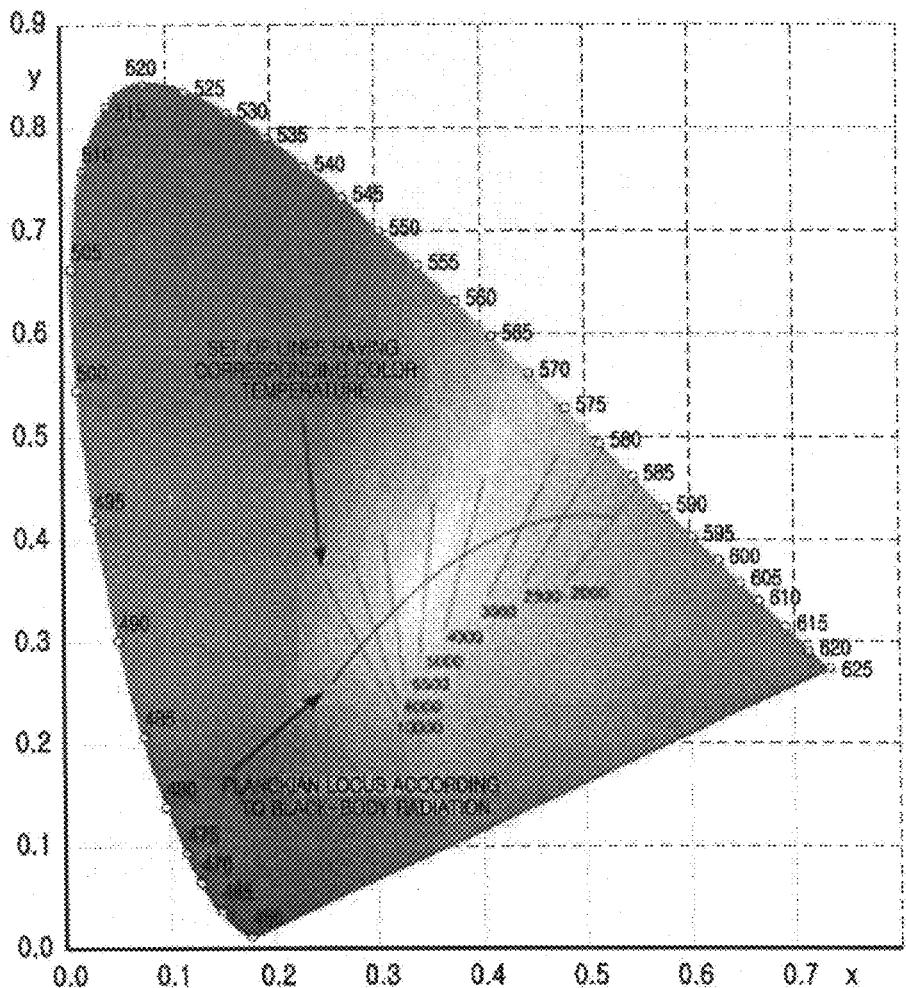
FIG. 4 illustrates a chromaticity diagram of an image having a distribution of various colors according to an exemplary embodiment of the present invention.

FIG. 4 illustrates a chromaticity diagram of an image having a distribution of various colors according to an exemplary embodiment of the present invention, wherein the mean value of the entire image is expressed in x and y coordinates, and the Planckian Locus representing a color temperature distribution based on black-body radiation is shown in the center of FIG. 4.

In addition, each line perpendicular to the Planckian Locus in FIG. 4 represents a set of point values having a corresponding color temperature. The Robertson method is a method of calculating the slope of a line having the same color temperature as that of achromatic color point values based on 31 color temperature values in an x-y domain, and being able to measure a color temperature based on the slope.

First, according to a procedure of conversion into the x-y domain, a value representing the characteristics of an image is first extracted, and the value is determined to be the mean value of the entire image for each RGB channel, and a conversion into the x-y domain is performed. The mean values of the respective RGB channels of an image, to which a white balance is to be applied, may be obtained by the following equation.

$$R_{mean} = \frac{\sum_{i=0}^{N-1}\sum_{j=0}^{M-1} R(i,j)}{N \times M},$$

$$G_{mean} = \frac{\sum_{i=0}^{N-1}\sum_{j=0}^{M-1} G(i,j)}{N \times M},$$

$$B_{mean} = \frac{\sum_{i=0}^{N-1}\sum_{j=0}^{M-1} B(i,j)}{N \times M} \quad (3)$$

Equation 3 shows a method of obtaining the mean values of the respective RGB channels on the assumption that an image, to which a white balance is to be applied, has a size of "N×M."

A procedure for conversion into the x-y domain through use of the mean values of the respective channels, obtained by equation 3, will now be described with reference to the following equation.

$$\begin{pmatrix} X \\ Y \\ Z \end{pmatrix} = \begin{pmatrix} 0.576700 & 0.297361 & 0.0270928 \\ 0.185556 & 0.627355 & 0.0706879 \\ 0.188212 & 0.075284 & 0.9912480 \end{pmatrix} \begin{pmatrix} R_{mean} \\ G_{mean} \\ B_{mean} \end{pmatrix} \quad (4)$$

$$x = \frac{X}{X+Y+Z},$$

$$y = \frac{Y}{X+Y+Z}$$

Equation 4 shows a method for performing a conversion into an XYZ domain through use of the mean values of the respective channels, obtained by equation 3, and then performing a conversion into an x-y domain by normalizing the XYZ.

Figure 5:
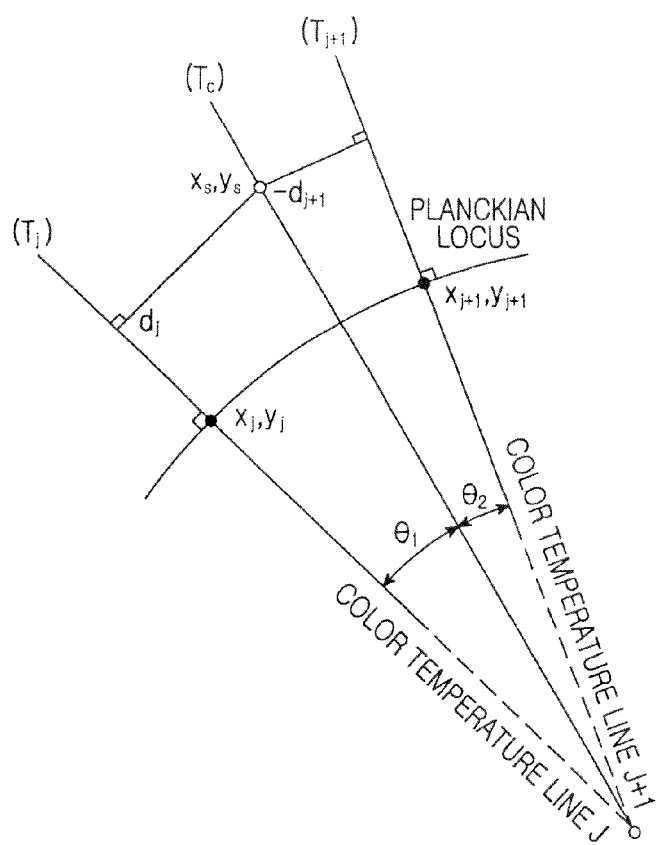
FIG. 5 is a view illustrating a color temperature measurement in an x-y domain of an image, to which a white balance is to be applied, according to an exemplary embodiment of the present invention.

FIG. 5 is a view illustrating a color temperature measurement in an x-y domain of an image, to which a white balance is to be applied, according to an exemplary embodiment of the present invention. FIG. 5 shows a detailed exemplary method of estimating a certain color temperature located between color temperatures $T_j$ and $T_{j+1}$ by using the Robertson method.

Still referring to FIG. 5m when it is assumed that the mean value of each obtained RGB channel for the entire image is "$(x_s, y_s)$," and a color temperature desired to be found is defined as "$T_c$," the desired color temperature can be measured by the following equation through use of a ratio of angles of arcs.

$$\frac{1}{T_c} = \frac{1}{T_j} + \frac{\theta_1}{\theta_1+\theta_2}\left(\frac{1}{T_{j+1}} - \frac{1}{T_j}\right) \quad (5)$$

In equation 5, $T_j$ and $T_{j+1}$ are values given by a preset table, as shown in FIG. 4, but $\theta_1$ and $\theta_2$ are unknown values. Since a very small angle θ can be substituted by "sine θ," the $\theta_1$ and $\theta_2$ can be expressed as the following equation.

$$\theta_1/\theta_2 = \sin\theta_1/\sin\theta_2 = d_j/d_{j+1} \quad (6)$$

In equation 6, "$d_j$" represents a distance between a line representing a $j^{th}$ color temperature and a point $(x_j, y_j)$ in which the characteristics of an image are reflected, and "$d_{j+1}$" represents a distance between a line representing a $(j+1)^{th}$ color temperature and a point $(x_{j+1}, y_{j+1})$ in which the characteristics of an image are reflected. A distance between a point and a line can be obtained by the following equation.

$$d_i = \frac{(v_s - v_i) - t_i(u_s - u_i)}{\sqrt{1 + t_i^2}} \qquad (7)$$

Accordingly, using a distance between a point and a line, the equation for obtaining the desired color temperature can be approximated to the following equation.

$$\frac{1}{T_c} \approx \frac{1}{T_j} + \frac{d_j}{d_j + d_{j+1}} \left( \frac{1}{T_{j+1}} - \frac{1}{T_j} \right) \qquad (8)$$

By use of equation 8, the desired color temperature can be estimated from "x" and "y" obtained by equation 4.

Thereafter, referring back to FIG. 3, in step 315, when it is assumed that a region representing the estimated color temperature is "S2," and a region of the Planckian Locus is "S1," a specified region including an intersection point between the region representing the estimated color temperature and the region of the Planckian Locus is determined to be an achromatic color region. This can be expressed as the following equation.

$$R_{sum} = \sum_{x(i,j), y(i,j) \in (S_1 \cup S_2)} R(i,j) \qquad (9)$$

$$G_{sum} = \sum_{x(i,j), y(i,j) \in (S_1 \cup S_2)} G(i,j)$$

$$B_{sum} = \sum_{x(i,j), y(i,j) \in (S_1 \cup S_2)} B(i,j)$$

In equation 9, "$S_1$" and "$S_2$" are defined by the following equation.

$$S_1 = \{(k,l) | x_m - \alpha < x(k,l) < x_m + \alpha \text{ and } y_m - \alpha < y(k,l) < y_m + \alpha, 0 \leq m \leq 31\}$$

$$S_2 = \{(k,l) | \text{estimated achromatic color}\} \qquad (10)$$

In equation 10, $(x_m, y_m)$ represents an intersection point between the Planckian Locus and a line according to a color temperature, and "$\alpha$" is defined as a constant value between 0 to 0.5.

Next, when the procedure has proceeded from step 303 to step 307, it is determined whether the image not having a distribution of various colors corresponds to a single-color image, and a white balance is adjusted according to a result of the determination, a method for which will now be described.

First, when it is determined in step 307 that the image is not a single-color image, but an image having a distribution of minority colors, it is impossible to identify an exact color temperature by the white balance adjustment method for an image having a distribution of a great number of colors. This is because a mean value inclined to a specific color is inevitably obtained when the mean value of each channel is calculated with respect to the entire image having a distribution of minority colors. Therefore, when it is determined that an image has a distribution of minority colors, a new method described below should be applied with respect to the image. Thus, when it is determined in step 307 that the image does not correspond to a single-color image, but to an image having a distribution of minority colors, values belonging to an achromatic color region based on color temperatures are used to adjust a white balance, which enable a color temperature to be measured, without inclining to a specific color. To this end, in step 309, the entire image is converted into the x-y domain, and then only pixel values included in achromatic color regions based on the color temperatures specified in a color temperature table, which is based on the Robertson method, are extracted.

Thereafter, distinguishing from the case of an image having a distribution of a great number of colors, for which the mean values of RGB in the entire image are used as representative values, in the present case the mean values of RGB of pixels having color temperatures included in achromatic color regions are used as representative values for the image having a distribution of minority colors. That is, when it is assumed in step 311 that "Rs" are values of xy coordinates on the Planckian Locus, corresponding to 31 color temperature values pre-specified in a color temperature table based on the Robertson method, only points belonging to "S1," are extracted by the following equation and are used to obtain a color temperature in step 313.

$$R_{sum} = \sum_{x(i,j), y(i,j) \in S_1} R(i,j) \qquad (11)$$

$$G_{sum} = \sum_{x(i,j), y(i,j) \in S_1} G(i,j)$$

$$B_{sum} = \sum_{x(i,j), y(i,j) \in S_1} B(i,j)$$

In equation 11, "$S_1$" is defined by the following equation.

$$S_1 = \{(k,l) | x_m - \alpha < x(k,l) < x_m + \alpha \text{ and } y_m - \alpha < y(k,l) < y_m + \alpha, 0 \leq m \leq 31\} \qquad (12)$$

In equation 12, $(x_m, y_m)$ represents 31 achromatic color points based on color temperatures obtained by the Robertson method in step 315. "S1" represents an achromatic color region having a predetermined range according to "$\alpha$" in the x-y domain. The value of "$\alpha$" is defined as a constant between 0 and 0.5, as in the case for an image having a distribution of various colors. An achromatic color estimation according to the estimated color temperature is performed based on a scheme of FIG. 5.

Figure 6:
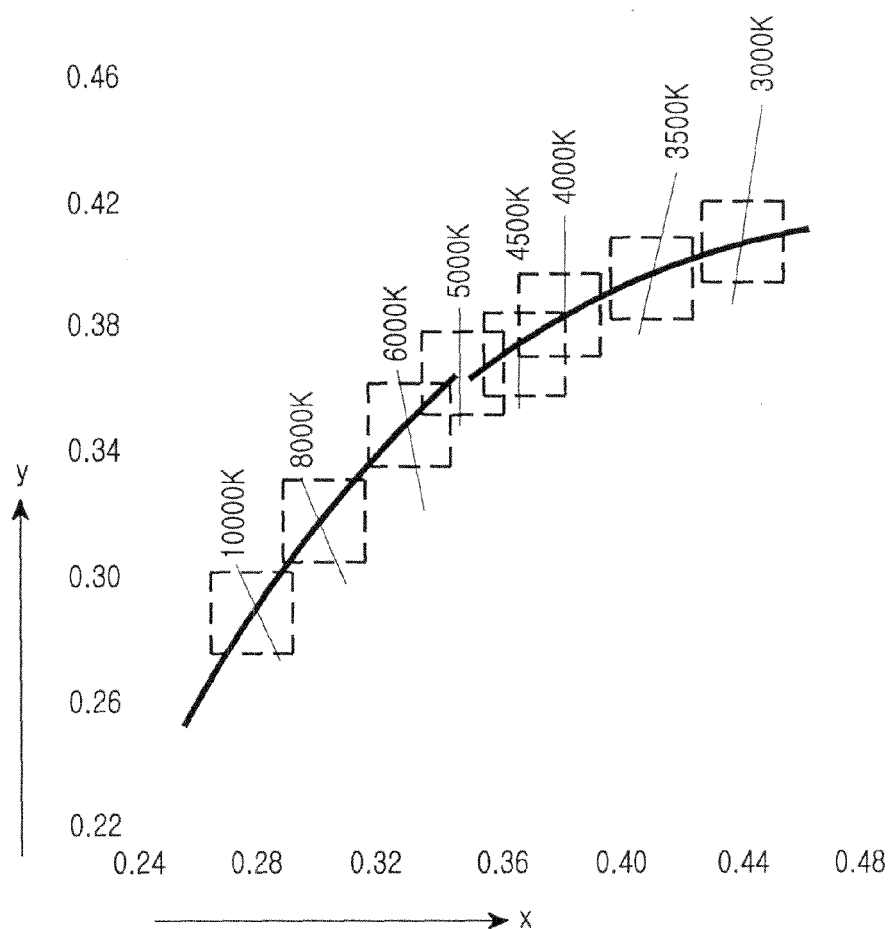
FIG. 6 is a view explaining a detection of an achromatic color region from an image having a distribution of a small number of colors according to an exemplary embodiment of the present invention.

FIG. 6 is a view explaining a detection of an achromatic color region from an image having a distribution of minority colors according to an exemplary embodiment of the present invention, wherein an achromatic color is estimated according to color temperatures. By using the achromatic color estimated by FIG. 6, a white balance is adjusted in step 317 (FIG. 3).

Meanwhile, when it is determined in step 307 that the image is constituted by a single color, it is impossible to identify an achromatic color. In this case, if the white balance algorithm is unreasonably applied, estimation of an exact color temperature fails due to insufficient information, so that the image is changed into an undesired color as a result of the application of the white balance algorithm. Therefore, when the image corresponds to a single-color image, where a color distribution of pixels included in the achromatic color region is equal to or less than a predetermined threshold value, step 319 is performed. In step 319, the white balance algorithm is not applied, and the input image is output as it is.

In step 317, the white balance algorithm is applied differently to an image having a distribution of a number of colors considered to be large, and an image having a distribution of minority colors. First, commonly, the RGB mean values of an achromatic color region are obtained by the following equation.

$$\bar{r} = \frac{R_{sum}}{N_{Ap}}, \quad (13)$$

$$\bar{g} = \frac{G_{sum}}{N_{Ap}},$$

$$\bar{b} = \frac{B_{sum}}{N_{Ap}}$$

In equation 13, "$R_{sum}$," "$G_{sum}$," and "$B_{sum}$" are obtained by equation 9 in the case of an image having a distribution of a great number of colors, i.e., an image whose color distribution is higher than a present threshold value and are obtained by equation 11 in the case of an image having a distribution of minority colors, i.e., an image whose color distribution is lower than a present threshold value.

"$N_{Ap}$" represents the number of pixels belonging to both "$S_1$" and "$S_2$" in equation 10 in the case of an image having a distribution of a great number of colors, and represents the total number of pixels belonging to 31 predetermined achromatic color regions in the case of an image having a distribution of minority colors.

RGB channel values, to which a white balance algorithm based on equation 13 is applied, can be obtained by the following equation.

$$\begin{pmatrix} R_{out}(i,j) \\ G_{out}(i,j) \\ B_{out}(i,j) \end{pmatrix} = \begin{pmatrix} \bar{g}/\bar{r} & 0 & 0 \\ 0 & 0 & 0 \\ 0 & 0 & \bar{g}/\bar{b} \end{pmatrix} \begin{pmatrix} R_{in}(i,j) \\ G_{in}(i,j) \\ B_{in}(i,j) \end{pmatrix} \quad (14)$$

An achromatic color region is identified through a color temperature estimation based on equation 14, and then a white point is derived. Accordingly, a white point is accurately estimated, so that the while balance of a corresponding image is accurately adjusted.

The apparatus and method for adjusting a white balance in a digital imaging device according to an exemplary embodiment of the present invention is achieved as shown in the examples described above. While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

As described above, according to the present invention, it is possible to achieve an accurate white balance of an image signal input from a camera sensor, thereby improving the quality of the image.

What is claimed is:

1. A method for adjusting a white balance in a digital imaging device, the method comprising:
    (a) analyzing a histogram of an image to which a white balance algorithm is to be applied in order to determine color distribution values;
    (b) classifying the image in step (a) according to color distribution determination criteria based on a mean value of the color distribution values, wherein the classifying includes:
        extracting an achromatic color region through a color temperature estimation; and
        estimating an accurate white point; and
    (c) applying the white balance algorithm to the image depending on results of the classification based on color distributions.

2. The method according to claim 1, wherein the application of the white balance algorithm is customized according to color distributions including color temperature estimation.

3. The method of claim 1, further comprising:
    storing, in a memory unit, the original image and/or an image to which the white balance algorithm is applied by the image processing unit; and
    displaying the original image and/or the image to which the white balance algorithm is applied on a screen of a display unit.

4. A method for adjusting a white balance in a digital imaging device, the method comprising:
    (a) analyzing a histogram of an image to which a white balance algorithm is to be applied;
    (b) classifying the image in step (a) according to color distribution determination criteria; and
    (c) applying the white balance algorithm to the image depending on results of the classification based on color distributions,
    wherein, in the step (b) includes: (i) comparing a color distribution of the image with a predetermined threshold value, (ii) determining the image to be an image having a distribution of various colors when the color distribution of the image is lower than the threshold value, and the image is determined to be an image having a distribution of a small number of colors when the color distribution of the image is equal to or higher than the threshold value, in which the comparison and determination are performed using equation $|dR-dG|<th1R$ $|dB-dG|<th1B$, wherein "dR," "dG," and "dB" represent differences between maximum values and minimum values of RGB channels, respectively, in pixels, to which the white balance algorithm is to be applied, except for pixels having brightness values of a predetermined upper "a" % and a predetermined lower "b" % in the image.

5. The method as claimed in claim 4, further comprising:
    estimating a color temperature value by converting a mean value of the entire image into an x-y domain when the image has a distribution of various colors; and
    detecting an achromatic color region by utilizing the estimated color temperature value.

6. The method as claimed in claim 5, wherein, in the step of estimating the color temperature value, the color temperature value is estimated by equation $$\frac{1}{T_c} \approx \frac{1}{T_j} + \frac{d_j}{d_j + d_{j+1}} \left( \frac{1}{T_{j+1}} - \frac{1}{T_j} \right),$$

wherein $d_j$ represents a distance between a line representing a $j^{th}$ color temperature and a point in which characteristics of the image are reflected, $d_{j+1}$ represents a distance between a line representing a $(j+1)^{th}$ color temperature and a point in which the characteristics of the image are reflected, and $T_j$ and $T_{j+1}$ are color temperature values given by a table, centering around a color temperature $T_C$ desired to be found.

7. The method as claimed in claim 5, wherein, in the step of detecting an achromatic color region, a region of an intersection point between the estimated color temperature value and a Planckian Locus is determined to be an achromatic color region.

8. The method as claimed in claim 4, wherein, when the image has a predetermined quantity of distribution of colors that are categorized as being a small number of colors, the image is classified into a single-color image and an image having a minority colors.

9. The method as claimed in claim 8, wherein, when the image is classified as a single-color image, the image, which has been input, is output without applying the white balance algorithm.

10. The method as claimed in claim 8, wherein, when the image is classified as an image having a distribution of minority colors, and a color temperature value is estimated by converting a mean value of pixels, which have a color temperature value included in an achromatic color region based on color temperature values pre-specified in a color temperature value table, into an x-y domain.

11. The method as claimed in claim 10, wherein a region of an intersection point between a Planckian Locus and a color temperature value pre-specified in the color temperature value table is determined to be the achromatic color region.

12. The method of claim 4, wherein the classifying includes extracting an achromatic color region through a color temperature estimation, and estimating an accurate white point.

13. The method of claim 4, further comprising:
storing, in a memory unit, the original image and/or an image to which the white balance algorithm is applied by the image processing unit; and
displaying the original image and/or the image to which the white balance algorithm is applied on a screen of a display unit.

14. A method for adjusting a white balance in a digital imaging device, the method comprising:
(a) analyzing a histogram of an image to which a white balance algorithm is to be applied;
(b) classifying the image in step (a) according to color distribution determination criteria; and
(c) applying the white balance algorithm to the image depending on results of the classification based on color distributions,
wherein applying the white balance algorithm includes calculating a mean value of each channel for an image having a distribution of various colors, and a mean value of each channel for an image having a distribution of a predetermined number of colors that are categorized as being a small number of colors are obtained, and the white balance algorithm is applied according to the two images.

15. The method as claimed in claim 14, wherein the obtaining of a mean value of each channel is achieved by applying a mean value of an entire image with respect to an image having a distribution of various colors, and by applying a mean value of pixels included in an achromatic color based on color temperatures of each channel with respect to an image having a distribution of a predetermined number of colors that are categorized as being small, through equation $$\bar{r} = \frac{R_{sum}}{N_{Ap}},$$

$$\bar{g} = \frac{G_{sum}}{N_{Ap}},$$

$$\bar{b} = \frac{B_{sum}}{N_{Ap}},$$

wherein $\bar{r}$, $\bar{g}$, and $\bar{b}$ represent mean values of an entire image in a case of an image having a distribution of a great number of colors, and represent mean values of pixels included in an achromatic color based on color temperatures of each channel in a case of an image having a distribution of minority colors, and "$N_{Ap}$" represents a number of pixels belonging to both a Planckian Locus region and a calculated color temperature region in the case of the image having the distribution of the great number of colors, and represents a total number of pixels belonging to a predetermined achromatic color region in the case of the image having the distribution of the minority colors.

16. The method of claim 14, wherein the classifying includes extracting an achromatic color region through a color temperature estimation, and estimating an accurate white point.

17. The method of claim 14, further comprising:
storing, in a memory unit, the original image and/or an image to which the white balance algorithm is applied by the image processing unit; and
displaying the original image and/or the image to which the white balance algorithm is applied on a screen of a display unit.

18. An apparatus for adjusting a white balance in a digital imaging device, the apparatus comprising:
an image sensor unit for photographing a subject and for creating an original image; and
an image processing unit for finding an achromatic color region through estimation of a color temperature of the original image, for extracting a white point of the achromatic color region and for adjusting a white balance of the original image, said image processing unit comprising
a hue detection unit for detecting a color distribution by identifying a histogram distribution characteristic of the original image;
a mean value calculation unit for receiving the detected color distribution and obtaining a mean value according to each channel of the original image;
a color temperature estimation unit for estimating a color temperature value through use of the mean value calculated by the mean value calculation unit, and detecting the achromatic color region according to the estimated color temperature value; and
a white balance application unit for applying a white balance algorithm to the original image based on the estimated color temperature value and the achromatic color region.

19. The apparatus as claimed in claim 18, further comprising:
a memory unit for storing the original image and/or an image to which the white balance algorithm is applied by the image processing unit; and
a display unit for displaying the original image and/or the image, to which the white balance algorithm is applied, on a screen.

20. The apparatus of claim 18, wherein the white balance application unit applies the white balance algorithm which is customized according to color distributions including color temperature estimation.

* * * * *